Aug. 18, 1936.    R. J. BURROWS ET AL    2,051,075
RAIL CAR
Original Filed May 9, 1932    3 Sheets-Sheet 1
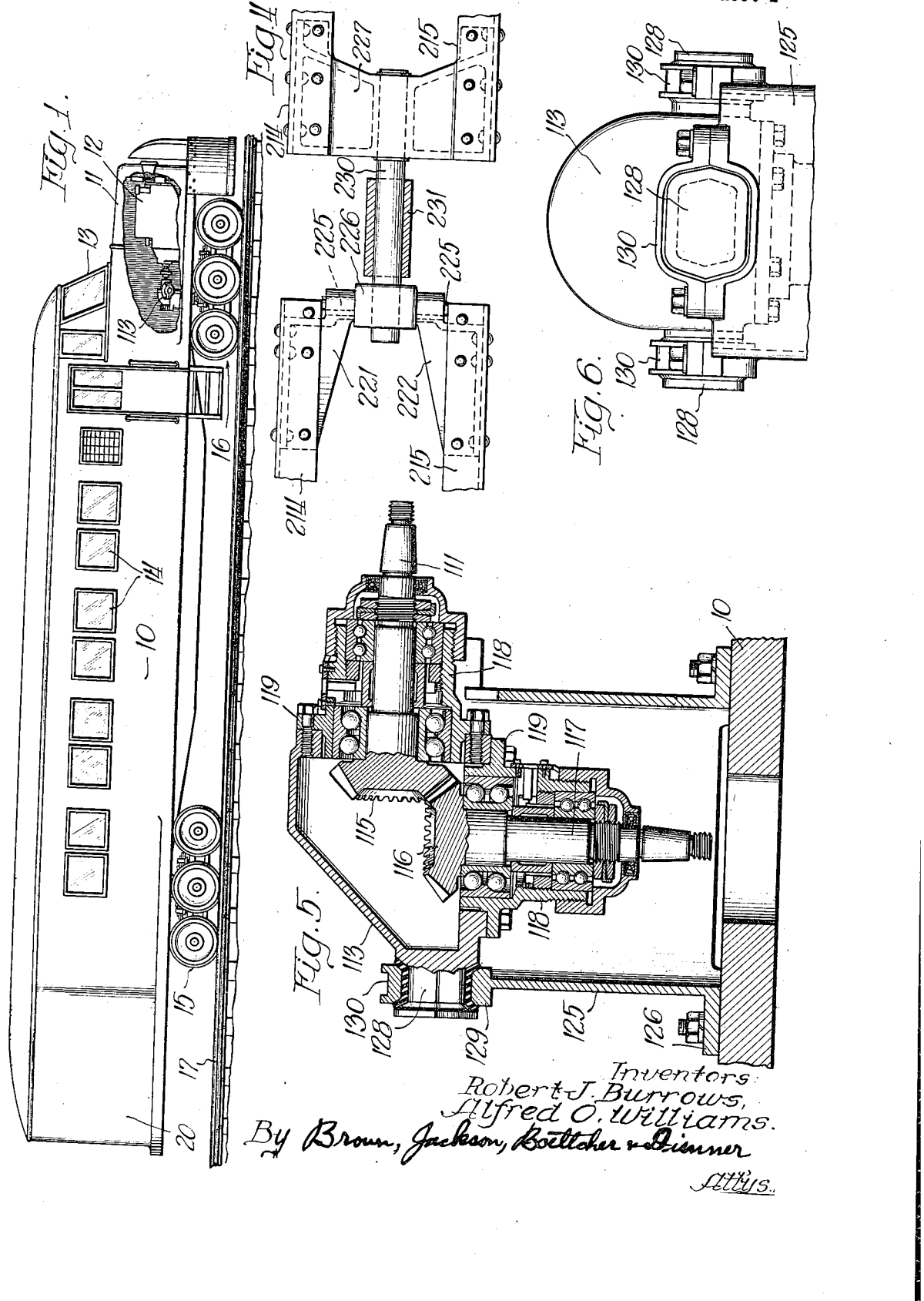
Inventors
Robert J. Burrows,
Alfred O. Williams.
By Brown, Jackson, Boettcher & Dienner
Attys.

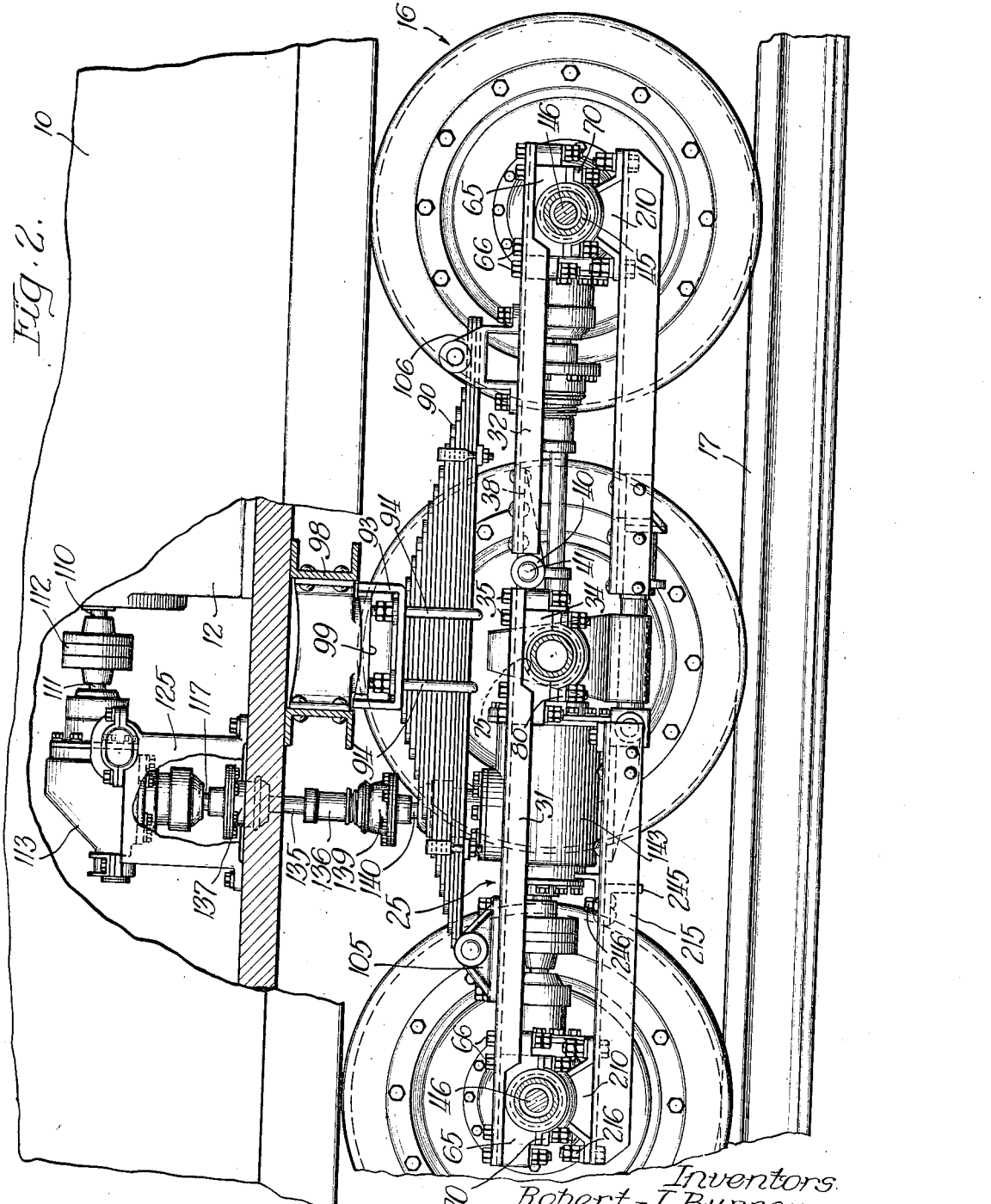

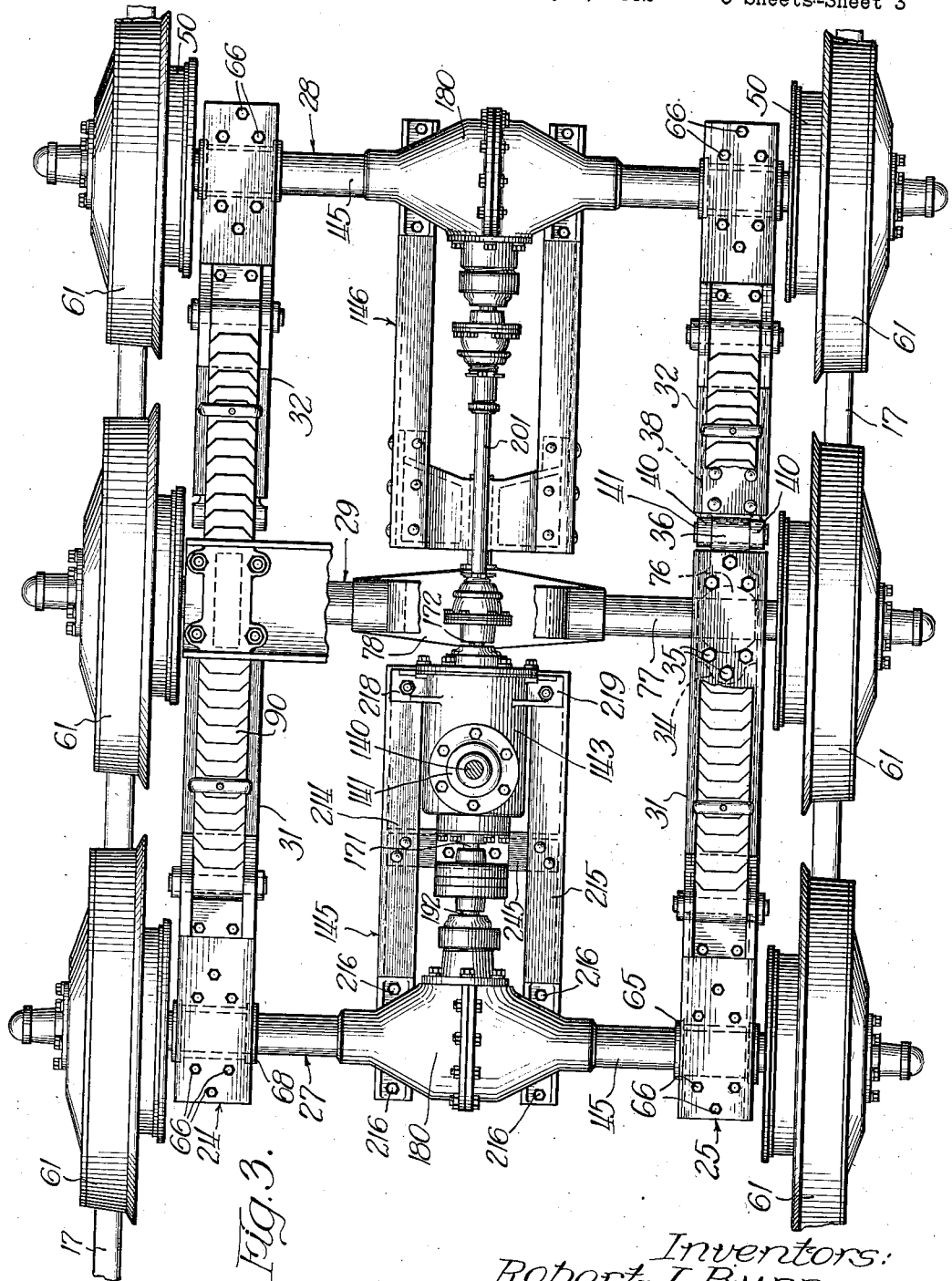

Patented Aug. 18, 1936

2,051,075

UNITED STATES PATENT OFFICE 2,051,075

RAIL CAR

Robert J. Burrows and Alfred O. Williams, Battle Creek, Mich., assignors to Clark Tructractor Company, Battle Creek, Mich., a corporation of Michigan Original application May 9, 1932, Serial No. 610,079. Divided and this application April 10, 1933, Serial No. 665,299

13 Claims. (Cl. 105—118)

This application is a division of our copending application, Serial No. 610,079, filed May 9, 1932.

The present invention relates generally to light weight rail cars and the like, particularly those of the type employing rubber tired wheels or other resilient wheel construction, and has for its principal object the provision of such a rail car wherein trucks are employed whereby the supporting wheels are all subjected to substantially the same loading, and wherein, for the same purpose, improved driving connections between the source of power and the driving truck or trucks are provided so that the trucks may be so disposed relative to the car body that the desired equal loading on the wheels is secured.

Another object of the present invention is the provision of a rail car or similar vehicle wherein the source of power and the driving connections therefrom to the driving truck are so arranged that approximately the same loads are imposed on the driving truck as are imposed on the other truck or trucks of the car.

Still further, another object of the present invention is to provide a truck having flexibly connected sections to permit the several supporting wheels to take positions in different horizontal planes without imposing undue twisting strains or the like on the truck frames or on the car body.

Still further, another object of the present invention is to provide driving means for such trucks when used as the driving truck or trucks in which the driving connections to the source of power are made without introducing undesirable angular relations between the component parts of the drive transmitting means. In this connection, the present invention also has for one of its objects the provision of differential means for transmitting the drive differentially to the several driving shafts without sacrificing clearance while still supporting the various parts of the differential means in a simple and sturdy manner.

These and other objects of the present invention will be apparent to those skilled in the art after a consideration of the following detailed description of the preferred structural embodiment which is illustrated in the accompanying drawings.

In the drawings:

Figure 1 is a side elevation of the complete rail car with part of the hood and body broken away in order to show the disposition of the power plant;

Figure 2 is an enlarged side view of the driving truck shown in Figure 1, certain parts being in elevation and certain parts in section, illustrating in particular the driving connections between the power plant and the driving wheels;

Figure 3 is a top plan view of the front driving truck shown in Figure 2, certain parts being broken away to better illustrate the relations involved;

Figure 4 is a fragmentary view illustrating the rotatable and shiftable connecting means between the two torque arms associated with the axle housings for the driving axles of the truck and the connection between these torque arms and the sleeve carried by the central or intermediate axle;

Figure 5 is a sectional view of the bevel gear set interposed between the clutch shaft of the power unit and the vertically disposed driving shaft connected to operate the driving truck; and Figure 6 is an elevational view of the upper part of the bevel gear set showing the same as it appears when looking forwardly relative to the rail car.

Referring now more particularly to Figure 1, it will be seen that our improved rail car comprises a streamlined car body 10 having a power plant compartment 11 in which is disposed a motor or other source of power 12, an operator's compartment 13, the usual passenger compartments lighted by windows 14 and supporting trucks 15 and 16 adapted to run on rails 17. To complete the streamlining of the body 10 the latter is preferably provided with a tapered tail 20.

The trucks 15 and 16 for the rail car are practically identical except that the forward truck is usually a driving truck while the rear truck is usually a trailing truck, although both may be made driving trucks if desirable, or both may be made trailing trucks in case the rail car is a trailer and is propelled by some source of power exterior to itself. The trucks 15 and 16 are somewhat similar in their generic features to the rail car truck disclosed in our copending application, Serial No. 603,462, filed April 6, 1932, over which in certain details the rail car truck herein disclosed is an improvement.

Referring now more particularly to Figures 2 and 3, the driving truck 16 will now be described in detail. As will be clear from Figure 3 the driving truck is of the six wheel type having side frames 24 and 25 supported upon the two outer or driving axles 27 and 28 and the intermediate or dead axle 29. Each side frame consists of a pair of pivotally connected sections 31 and 32, preferably in the form of channels, and the outer ends of the channel sections 31 and 32 are connected to the driving axles 27 and 28 as will be later described in detail. The inner ends of the frame sections 31 carry castings 34 secured thereto, as by bolts 35. One end of each of the castings extends beyond the forward end of the frame section 31 and is reduced in width to form knuckles 36, as indicated in Figure 3. The adjacent inner ends of the companion frame sections or channels 32 carry castings 38 riveted or otherwise secured thereto and provided with lugs 40 adapted to embrace the knuckles 36. Pins or pintles 41 are passed through the pairs of lugs 40 and the associated knuckles 36 and serve thereby to pivotally connect the frame sections.

The two driving axles 27 and 28 and the dead axle 29 include housings journaled in the side frames 24 and 25. In order to provide the required flexibility in conjunction with the articulated frame members and to permit the independent vertical movement of the supporting wheels, the frame members 24 and 25 are supported upon the intermediate wheel axles 29 by spherical bearing means to permit relative universal movement between the intermediate axle and the frame members, as best shown in Figure 3, while the driving axles 27 and 28 have cylindrical bearings upon which the outer ends of frame members 24 and 25 are mounted, as best shown in Figure 2.

Referring now more particularly to Figures 2 and 3, it will be seen that the driving axle 28 comprises an axle housing 45 and an enclosed axle shaft 46. The axle housing 45 extends laterally outwardly beyond the side frames and is reduced in diameter to afford a bearing support for a brake drum structure 50. For further details of the axle and brake construction, reference may be had to the copending application of which this application is a division.

As best indicated in Figure 3, all of the wheels, indicated by the reference numeral 61, are provided with brakes 50 substantially identical with the brake construction referred to above. While Figure 3 shows the driving truck it will also be understood that the trailing truck may, and preferably does, have brakes of the identical construction.

As far as flexibility is concerned, the rail car truck of the present invention is made flexible by virtue of the articulated frame members and the spherical bearings by which these members are supported upon the central or intermediate axle. Referring now more particularly to Figure 3, it will be seen that in the illustrated embodiment the intermediate axle 29 is not a driving axle but is merely a dead axle having journaled at its outer ends the supporting wheels 61. The side frames, as mentioned above, are supported upon the intermediate axle 29 by means for spherical bearings by virtue of which the axle 29 has rocking or universal movement with respect to the frame members.

The cylindrical bearings employed for the driving axles consist of blocks or castings 65 secured to the outer ends of the frame sections by bolts 66. A bearing collar or bushing 68 is secured to or mounted on each end of each of the driving axle housings 45 in any desired manner. Each o the bushings 68 is cylindrical in formation and fits within the semi-cylindrical bearing portion of each of the blocks 65. A cap 70 is secured to the inside of each of the bearing blocks 65 and serves to retain the associated bushing 68 in its bearing.

The frame sections 31 have secured thereto the castings 34, as described above in connection with the pivotal articulation of the side frames 24 and 25. The castings 34 are also utilized as bearing blocks having the semi-spherical bearing portion 75 to receive the spherical bushing 76 secured to the tubular sections 77 forming with the central yoke 78 the intermediate axle. The bearing blocks 34 form the upper half of the bearings for the intermediate axle, and caps 80, similar in form to caps forming a part of the bearings for the driving axles 27 and 28, form the lower half of these bearings. The caps 80 are constructed to receive the spherical bearing bushings 76.

By virtue of this construction, as clearly set forth in our copending application mentioned above, each of the supporting wheels 61 may have vertical movement more or less independent of the other wheels without imposing undue twisting strains on the framework of the truck as a whole. Not only does this construction permit the truck to operate silently and smoothly over uneven road beds and irregular rails, switches and the like, but also it permits one wheel to be raised sufficient to allow the flange of the wheel to clear the rail, thereby permitting the tire thereof to be easily and quickly dismounted.

As more clearly pointed out in our copending application, mentioned above, the flexible construction is of especial importance where the weight of the car body is to be imposed equally upon all of the supporting wheels. For this purpose we preferably employ semi-elliptic springs 90 having their central portions secured to a truck bolster 93 by means of U-bolts 94. At its center the truck bolster 93 is provided with the conventional king pin construction. By this means the car bolster 98 is supported centrally upon the truck bolster 93. Suitable side bearings 99 are provided and are adapted, in the usual manner, to prevent excessive sidewise rocking of the car body relative to the truck bolster 93.

The ends of the semi-elliptic springs 90 and 91 are disposed in the vertical longitudinal planes of the frame members 24 and 25 and are connected to the frame sections 31 and 32 in such a manner in the preferred embodiment that substantially equal loads are imposed upon the wheels of the truck. For this purpose the connections between the ends of the springs 90 and 91 and the frame sections are disposed in the neighborhood of two-thirds of the distance between the intermediate axle and the front and rear axles, respectively.

Specifically, the connections between the ends of the springs 90 and the frame sections 31 and 32 are more or less representative of the conventional construction, particularly constructions of the type where driving and braking thrusts are transmitted from the driving wheels to the car body through the springs. The ends of the springs to which the driving and braking thrusts are transmitted are pivotally secured to spring brackets 105 while the opposite ends of the springs are supported upon similar brackets 106 for relative sliding movement to take care of the flexing of the springs.

Mention has been made above that the front and rear axles are driving axles while the central or intermediate axle is a dead axle. It is to be understood, however, that the principles of the present invention are applicable to trucks employing only front and rear axles, particularly in so far as the means for transmitting power to the driving axles is concerned. Such means will now be described.

Referring for the moment to Figure 2, it will be observed that the car body 10 carries the power plant 12 and that power is transmitted therefrom to the driving truck 16, the front axle of which is practically directly underneath the power plant 12. The latter includes a longitudinally disposed shaft 110 which drives a shaft section 111 through a flexible coupling 112. The shaft section 111 is journaled for rotation in the housing 113 of a bevel gear set, and at its rear end the shaft section 111 is provided with a bevel gear member 115 which meshes with a companion bevel gear member 116 carried at the upper end of a vertically disposed shaft section 117 also journaled in the bevel gear housing 113. It will be noted from Figure 5 that the shaft sections 111 and 117 are practically identical, with the exception that one is disposed longitudinally in a horizontal plane while the other is disposed vertically. Each of these shaft sections is preferably supported by anti-friction bearing means in a bearing sleeve 118 which includes a flange 119 by means of which each bearing sleeve is bolted to the bevel gear housing 113.

The housing 113 is supported from the floor of the car by a suitable pedestal structure 125 provided with supporting feet 126 which are adapted to be bolted directly to the floor of the car 10. The housing 113 is not rigidly connected with its supporting pedestal 125, but preferably the bevel gear housing 113 is provided with suitable supporting lugs or bosses 128, one at the rear of the housing and one at each side thereof, and these bosses are supported in suitable brackets 129 secured to or forming a part of the supporting pedestal 125. Caps 130 serve to secure the housing 113 in place, and suitable bushings of rubber or other resilient material are interposed between the bosses 128 and the supports therefor whereby the housing 113 is resiliently supported upon the car body and capable of a limited amount of movement relative thereto.

The drive from the shaft section 117 is transmitted downwardly to the driving truck through a vertically disposed shaft construction embodying a pair of telescopic shaft sections 135 and 136, the former being connected with the shaft section 117 through a universal joint 137. The lower end of the lower telescopic shaft section 136 is also provided with a universal joint 139 by which it is connected with a vertically disposed shaft section 140 carried upon the driving truck.

Referring now more particularly to Figures 2 and 3, it will be observed that the shaft section 140 is journaled for rotation in a bearing sleeve 141 and that this bearing sleeve 141 is mounted upon a casing or housing 143. This housing is suitably supported upon the driving truck in any desired manner, but preferably it is carried upon torque arms 145 and 146 having their outer ends secured to the driving axle housings 45 and their inner ends anchored to the intermediate axle 29.

The casing 143 constitutes the differential housing and the shaft section 140 is provided with a bevel gear connected to drive differential mechanism of any suitable character, including the usual differential pinions and cooperating differential gears, the latter being splined or otherwise connected to drive a pair of longitudinally disposed drive shafts 171 and 172 which are disposed longitudinally of the rail car truck and connected to drive, respectively, the driving axles 27 and 28.

By virtue of this construction, which is set forth in more detail in our copending application mentioned above, the driving parts of the differential and associated parts are supported in a strong and sturdy manner since the torque arms 145 and 146 serve admirably as supporting means for the differential mechanism. In addition, the diameter of the differential housing 143 may be made small so as to afford the proper clearance while yet disposing the differential and the associated structure substantially in the horizontal plane of both driving axles.

The largest portion of the weight of the differential housing 143 and associated structure is carried upon the torque arm 145, the rear end of which is connected directly with the rear axle housing 45. This particular construction disposes the drive shaft 171 closely adjacent the rear driving axle. As best shown in Figure 3, each of the axle housings 45 consists of a pair of tubular sections joined together by means of a central casing 180 which contains suitable gear means, such as a bevel gear or the like (not shown), secured to or mounted on the associated axle shaft 46. Preferably, the axle shafts 46 are through axles. The driving shafts 171 and 172 are connected to drive the respective bevel gears and the connected driving axles 46 by means of suitable connections which include shafts 192 and 201 and the usual universal joints to allow for longitudinal and lateral, as well as angular, displacement of the forward driving axle with respect to the differential housing 143.

As mentioned above, due to the mounting of the driving and dead axle housings for rotation in the side frame members 24 and 25 it is necessary to provide torsion members or torque arms to take care of the stresses developed due to driving and braking reactions. Preferably, torque arms are provided, one rigidly connected with each of the front and rear axle housings and anchored centrally of the truck to the intermediate wheel axle. For this purpose the casings 180 are each provided with brackets or bosses 210 to which the outer ends of the torque arms are securely bolted or otherwise rigidly secured thereto. The rear torque arm 145 comprises a pair of angle bars 214 and 215, their rear ends being bolted to the brackets 210, as by bolts 216, as best shown in Figure 3. The forward or inner ends of the angle bars 214 and 215 are securely bolted to oppositely disposed ears 218 and 219 secured to or forming a part of the differential housing 143. Also, as best shown in Figure 4, the vertical flanges of the angle bars 214 and 215 are secured to a pair of castings 221 and 222, as by riveting or the like. These castings or brackets are bored to receive the pivots 225 of a swivel block 226 mounted therebetween. The angle bars 214 and 215 of the forward torque arm are riveted to a casting member 227 having suitable webs and flanges to strengthen the same and a central bore in which is secured, as by welding or the like, a cylindrical bar 230 which is slidable and rotatable in the swivel block 226 and is also received within a sleeve 231 connected with and forming a part of the yoke 78 of the intermediate axle 29, as best shown in Figures 2 and 4.

From the above description it will be apparent that any braking or driving strains which would tend to rotate the housings 45 or the intermediate housing 77 will be resisted by the torque arm construction. While both of the torque arms 145 and 146 are anchored at their inner ends to the central or intermediate axle 29, it will be observed that the driving and braking reactions developed at the driving axles are balanced one against the other by virtue of the fact that one of the torque arms extends forwardly from the axle to which it is connected while the other torque arm extends rearwardly. Thus, where the driving reactions tend to rotate the axle housing in a direction to raise the inner end of the associated torque arm the reactions developed at the other driving axle tend to cause the rear end of the associated torque arm to move downwardly. In this manner the reactions are balanced or neutralized. The anchoring of the inner ends of both of the torque arms to the intermediate axle takes care of any inequalities in the reactions developed and also effectively resists all braking reactions developed at the intermediate axle when the brakes are applied. The pivotal and swivel connections between the two torque arms and the rotational and slidable association which these parts have relative to the yoke of the central axle provide, in connection with the articulated side frame members, a very flexible rail car truck in which all load strains are properly taken care of without excessive weight.

Since the intermediate axle 29 must be of a construction to accommodate the central longitudinally disposed drive shafts, it is preferable to provide a construction such as the yoke 78 having the central aperture to accommodate the driving shafts, rather than a construction such as that shown for the driving shafts, embodying through axles. Where the intermediate axle is a dead axle the supporting wheels and the brake drum structure may be practically the same as the supporting wheels and brake drum structure for the driving axles.

The operation of our improved rail car construction is believed to be apparent from the above description. The power plant 12 of the rail car is disposed in such a position that, by virtue of the vertically disposed driving means for the front driving truck, that approximately the same weight will be imposed on the rear truck as on the forward truck. Where the power plant 12 is in the form of an internal combustion engine of the usual type, conventional transmission means may be incorporated therewith, such as the usual change gear box, in which case the drive shaft 110, see Figure 2, will be driven from such change gear means. The drive from the power plant 12 is thus transmitted to the bevel gear set 113, and from thence the drive is transmitted through the flexible telescopic drive shaft connection to the differential disposed within the differential housing 143. By virtue of the differential means therein the drive is divided differentially between the front and rear driving axles. With respect to the differential, the preferred arrangement is such that a differential housing of relatively small diameter may be employed, as shown, so that the clearance of the rail car truck is not unduly reduced. The torque arm construction 145 affords a convenient accessible support for the differential, the latter being carried upon the torque arm 145 by virtue of the oppositely disposed arms 218 and 219, see Figure 3, and the transverse angle bar 245 secured, as by riveting, to the angle bars 214 and 215 and to which one end of the differential housing 143 is bolted as indicated by the reference numeral 246 in Figure 2.

The ends of the axle housings are mounted for rotation relative to the frame members 24 and 25, and the driving and braking torque is resisted by the torque arms 145 and 146 which, as described above, are so arranged that the torque developed in one of the arms is balanced and neutralized by the torque in the other arm. The two torque arms are, however, anchored at their inner ends to the intermediate wheel axle, the connections being such that relative angular and linear displacement may take place between the torque arms, this being desirable in view of the articulated frame construction and the spherical support of the frame members on the intermediate axle.

The driving axles are through axles, affording a sturdy support for the two driving wheels associated therewith, the wheels being supported for limited lateral movement upon the hubs of the associated brake drums, the latter being mounted for rotation upon the ends of the axle housings. Preferably, although not necessarily, the wheels for the intermediate axle are fastened directly to the hubs of the associated brake drums.

We have mentioned above that the rail car truck of the above description preferably utilizes flanged wheels having treads of rubber or other resilient material. The wheel construction per se forms no part of the present invention except in so far as it is a part of the general arrangement.

While we have described above some of the generic features of our present invention, it is to be understood that our invention is not to be limited to the specific details shown and described, but that, in fact, widely different means may be employed in the practice of the broader aspects of our invention. For example, while we have shown only one motor for driving both axles, it is to be understood that we could, if desired, employ a separate motor for each axle.

What we claim, therefore, and desire to secure by Letters Patent is:

1. A self-propelled rail car comprising a body, front and rear trucks supporting said body, said front truck comprising side members, driving axles at the front and rear ends of said side members, an intermediate axle connected with said side members, a source of power on the body, a longitudinal shaft having driving connections with said front and rear driving axles, and means for driving said last mentioned shaft from said source of power on the body comprising a vertically arranged driving shaft disposed between said intermediate axle and said rear driving axle, said source of power being disposed substantially above the front driving axle.

2. A self-propelled rail car comprising a body, front and rear trucks supporting said body, said front truck comprising side members, driving axles at the front and rear ends of said side members, an intermediate axle connected with said side members, a source of power on the body, a longitudinal shaft having driving connections with said front and rear driving axles, and means for driving said last mentioned shaft from said source of power on the body comprising a vertically arranged driving shaft disposed between said intermediate axle and said rear driving axle and a bevel gear set connecting said vertical drive shaft with said source of power, the latter being disposed substantially vertically above the front driving axle.

3. A rail car comprising, in combination a body, a front driving truck including longitudinally disposed frame members, front and rear driving axles journaled on said frame members, a central dead axle disposed intermediate said front and rear driving axles, supporting wheels on said axles, a bolster supporting the forward end of said body, spring means mounting said bolster on said frame members, means for driving said truck including a source of power carried by said body and disposed substantially directly above said front driving axle, a short driving shaft connected with said source of power, vertically disposed drive shaft means having one end carried by the car body and the other carried by said driving truck, a bevel gear set connecting said vertically disposed shaft means with said short driving shaft, and means connecting the lower end of said vertically disposed shaft means with said driving axles to drive the same differentially, said vertically disposed shaft means being positioned in rear of said bolster, and a trailing truck supporting the rear end of said body and disposed forwardly thereof a distance sufficient to impose thereon loads substantially equal to the loads imposed upon said front driving truck.

4. A self-propelled rail car comprising a body, front and rear trucks supporting said body, said front truck comprising side members, driving axles near the front and rear ends thereof, means pivotally connecting the trucks with the car body, a source of power on the body, a longitudinal shaft having driving connections with said front and rear driving axles, supporting wheels mounted on the ends of said axles, and means for driving said last mentioned shaft from said source of power on the body comprising a vertically arranged driving shaft disposed between the pivot axis of the front truck and said rear driving axle, said source of power being disposed substantially above the front driving axle so as to dispose substantially equal weights on said front and rear trucks and substantially centrally between said wheels so as to impose substantially equal weights on said supporting wheels.

5. A self-propelled rail car comprising a body, front and rear trucks supporting said body, said front truck comprising side members, driving axles at the front and rear ends of said side members, a source of power on the body, longitudinally disposed shaft means connected with said front and rear driving axles, a torque arm connected with one of said axles, anchoring means for said torque arm, and means for driving said last mentioned shaft from said source of power on the body comprising differential mechanism mounted on said torque arm and connected with said shaft means, a vertically disposed shaft connected with said differential mechanism and disposed adjacent one of said axles, and connecting means between said vertically disposed shaft and said source of power, said source of power being disposed substantially above the other of said axles.

6. A self-propelled rail car comprising a body, front and rear trucks pivotally connected therewith, one of said trucks serving as a driving truck and comprising side members, driving axles at the front and rear ends of said side members, a source of power on the body, a pair of torque arms, one connected with each of said driving axles, anchoring means limiting the angular movement of said arms, a longitudinal shaft having driving connections with said front and rear driving axles, and means for driving said last mentioned shaft from said source of power on the body comprising a vertically arranged driving shaft having one end carried by one of said torque arms and disposed adjacent one of said end axles, said source of power being disposed substantially over the other of said axles.

7. A self-propelled rail car comprising a body, front and rear trucks pivotally connected therewith, one of said trucks serving as a driving truck and including longitudinally disposed frame members, front and rear driving axles journaled on said frame members, a bolster supporting one end of the body on said truck, spring means mounting the bolster on said frame members, means for driving said truck including a source of power carried by said body and disposed substantially directly above one of said driving axles, a short driving shaft connected with said source of power, vertically disposed drive shaft means having one end carried by the car body and the other carried by said driving truck, a bevel gear set connecting said vertically disposed shaft means with said short driving shaft, and means connecting the lower end of said vertically disposed shaft means with said driving axles to drive the same differentially, said vertically disposed shaft means being spaced from said bolster.

8. A self-propelled rail car comprising a body, front and rear trucks pivotally connected therewith, one of said trucks serving as a driving truck and including longitudinally disposed frame members, front and rear driving axles journaled on said frame members, a bolster supporting one end of the body on said truck, spring means mounting the bolster on said frame members, means for driving said truck including a source of power carried by said body and disposed substantially directly above one of said driving axles, a driving shaft connected with said source of power, downwardly extending drive shaft means having one end carried by the car body and the other carried by said driving truck, a bevel gear set connecting said downwardly extending shaft means with said driving shaft, and means connecting the lower end of said downwardly extending shaft means with said driving axles to drive the same differentially, said vertically disposed shaft means being spaced from said bolster.

9. A self-propelled rail car comprising a body, front and rear trucks supporting said body, said front truck comprising side members, driving axles at the front and rear ends of said side members, longitudinally disposed shaft means connected with said front and rear driving axles, a torque arm connected at one end with one of said axles, anchoring means for the other end of said arm, a source of power disposed on the car body forward of said torque arm, and means for driving said last mentioned axle from said source of power on the body comprising differential mechanism mounted on said torque arm and connected with said shaft means.

10. A self-propelled rail car comprising a body, front and rear trucks supporting said body, said front truck comprising side members, driving axles at the front and rear ends of said side members, longitudinally disposed shaft means connected with said front and rear driving axles, a torque arm connected at one end to the lower side of one of said axles underneath said longitudinaly disposed shaft means, anchoring means for the other end of said arm, a source of power disposed on the car body over the front axle and forward of said torque arm, and means for driving said shaft means from the source of power on the body and including a gear set mounted on said torque arm and disposed substantially in the horizontal plane of said driving axles.

11. A self-propelled rail car comprising a body, front and rear trucks supporting said body, said front truck comprising side members, driving axles at the front and rear ends of said side members, a source of power on the body disposed centrally over the front driving axle and the rear truck being disposed forward of the rear end of the car body further than the front truck is disposed in rear of the front end of the car body, longitudinally disposed shaft means connected with said front and rear driving axles, a torque arm connected with each of said axles, each of the torque arms being connected to the under side of the associated axle, anchoring means for said arms, and means for driving the longitudinally and centrally disposed shaft means from said source of power on the body and including a gear set disposed in alignment with said shaft means and carried on one of said torque arms substantially in the plane of said driving axles.

12. A self-propelled rail car comprising a body, front and rear trucks supporting said body, said front truck comprising side members, driving axles at the front and rear ends of said side members, a source of power on the body, longitudinally disposed shaft means connected with said front and rear driving axles, means serving as a torque arm connected with one of said axles, anchoring means for said torque arm means, and means for driving said last mentioned axle from said source of power on the body comprising gear means mounted on said torque arm and connected with said shaft means, substantially vertically disposed shaft means connected with said gear means, the latter and said shaft means being disposed adjacent the inner end of the associated torque arm means, and connecting means between said vertically disposed shaft and said source of power, said source of power being disposed substantially above the other of said axles.

13. A self-propeller rail car comprising a body, front and rear trucks supporting said body, said front truck comprising side members, driving axles at the front and rear ends of said side members, longitudinally disposed shaft means connected with one of said driving axles, a torque arm connected with said one axle, anchoring means for said arm, a source of power disposed on the car over the other axle and spaced longitudinally of said torque arm, and means for driving said one axle from said source of power including gear means carried by said torque arm and connected with said shaft means.

ROBERT J. BURROWS.
ALFRED O. WILLIAMS.